United States Patent [19]

Matsuura

[11] Patent Number: 4,771,640
[45] Date of Patent: Sep. 20, 1988

[54] LOAD INTRODUCING DEVICE

[75] Inventor: Michinori Matsuura, Shiga, Japan

[73] Assignee: Shinpo Kogyo Kabushiki Kaisha, Japan

[21] Appl. No.: 90,503

[22] Filed: Aug. 28, 1987

[51] Int. Cl.⁴ .................. G01D 5/134; G01L 9/00
[52] U.S. Cl. .................. 73/862.64; 73/705; 250/231 R
[58] Field of Search ............... 73/862.64, 705, 862.67; 250/231 P, 31 R; 177/DIG. 6

[56] References Cited

U.S. PATENT DOCUMENTS 3,625,062 12/1971 Heske .................... 73/705
4,403,144 9/1983 Strahan et al. .......... 250/231 R

FOREIGN PATENT DOCUMENTS 0218179 1/1985 U.S.S.R. .................. 73/705

Primary Examiner—Donald O. Woodiel
Attorney, Agent, or Firm—Burns, Doane, Swecker & Mathis

[57] ABSTRACT

A load introducing device includes a rectangular yoke having a pair of opposite flexible sides, a pair of opposite rigid sides connected to the flexible sides and a cantilever portion extending from one of the rigid sides parallel with the flexible sides. The cantilever portion includes a free end terminating adjacent the other of the rigid sides. A load introducing rod is fixed to extend perpendicularly from the cantilever portion. An optical displacement sensor is provided between the cantilever portion free end and the adjacent rigid side. A plurality of fitting holes are formed in the adjacent rigid side.

12 Claims, 3 Drawing Sheets

LOAD INTRODUCING DEVICE

BACKGROUND OF THE INVENTION

1. Field of the Invention

The present invnetion relates to a load introducing device used as a part of a force gauge or as a part of a machine wherein measurement of tensile or compressive force is carried out in the normal course of operation.

2. Background Description

Force gauges or devices for measuring force are generally manufactured on a small scale and are accompanied by disadvantages due to the use of adhesive materials for attaching strain gauges. That is to say, the use of adhesive materials not only requires know-how and skill, but also requires troublesome adjustment of the electrical circuit. Further, there is a fear of an occurrence of error due to aging of adhesive materials. Therefore, it is desirable to avoid the use of a strain gauge as a force measuring device.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention this is accomplished by providing a load introducing device including a yoke having a pair of opposite flexible sides, a pair of opposite rigid sides and a cantilever portion extending from one of the rigid sides and between the flexible sides. A load introducing rod is fixed perpendicularly to the cantilever portion. An optical displacement sensor is provided between the cantilever portion and one of the rigid sides.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DETAILED DESCRIPTION

Figure 1:
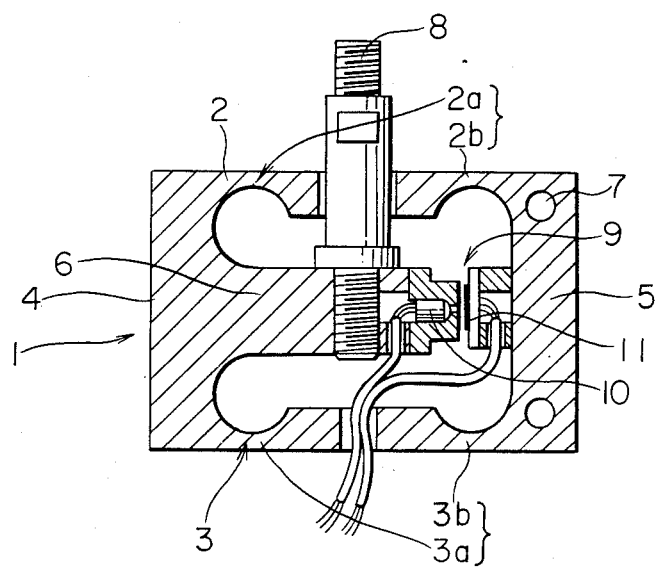
FIG. 1 is a cross-sectional view illustrating an embodiment of the load introducing device according to the present invention.

In the figures, a load introducing device is generally designated 1 and includes a rectangular yoke comprising a pair of oppositely arranged flexible sides, 2, 3, a pair of oppositely arranged rigid sides 4, 5 connecting the ends of the flexible sides 2, 3, and an additionally provided cantilever portion 6 extending from one rigid side 4 in parallel with the flexible sides 2, 3. The flexibility of the side 2 is provided by a pair of low section-modulus portions 2a, 2b. Similarly, the flexibility of the side 3 is provided by a pair of low section-modulus portions 3a, 3b. One rigid side 5 opposing the other rigid side 4, on which the cantilever portion 6 is provided, is a portion for attaching the device 1, by means of a plurality of fitting holes 7 and screws 12, to a case 13 of an associated force gauge, see also FIGS. 3 and 4.

A load introducing rod 8 is fixed perpendicularly to the additionally provided cantilever portion 6. The load introducing rod 8 is movable axially by a force applied on it deflecting the sides 2, 3. The axial displacement of the load introducing rod 8 is detected by an optical displacement sensor 9 provided between the cantilever portion 6 and the rigid side 5.

The displacement sensor 9 is composed of a light source 10 and a semiconductor element 11. The signals issued by the displacement sensor 9 are amplified by an amplifier and operate an indicator on an associated force gauge, not shown.

One of the light source 10 and the semiconductor element 11 is attached to the cantilever portion 6 and the other is attached to the rigid side 5.

Figure 2:
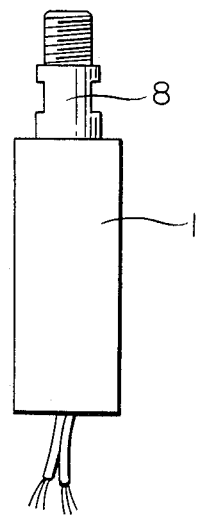
FIG. 2 is a side view of the device shown in FIG. 1.
Figure 3:
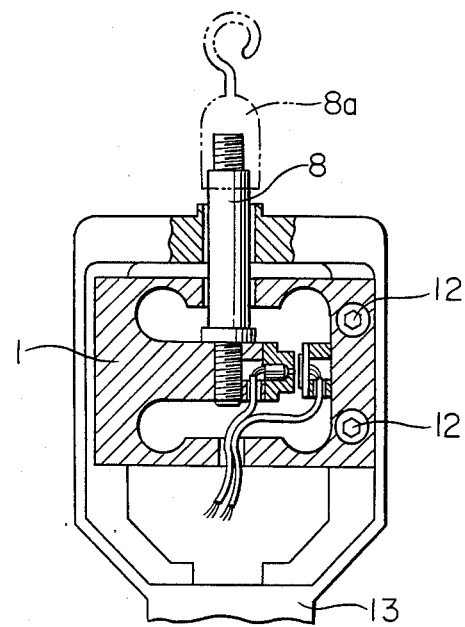
FIG. 3 is a partial cross-sectional side view illustrating the load introducing device of FIG. 1 mounted in a force gauge.
Figure 4:
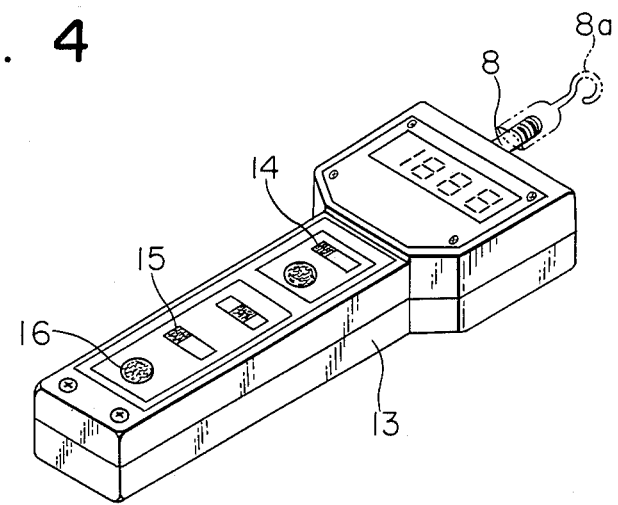
FIG. 4 is a perspective view illustrating the load introducing device combined with a force gauge.

FIGS. 3 and 4 illustrate an example of force gauge 13 with which the load introducing device 1 of FIGS. 1 and 2 is used. Screws 12 pass through fitting holes 7 provided on rigid side 5 of the yoke of device 1. An adapter 8a is attached to an exposed end of load introducing rod 8. Several switches 14, 15 and 16 are provided in case 13 of the force gauge. Switch 14 is a measuring switch, switch 15 is a unit-selecting switch and switch 16 is a memory switch.

Figure 5:
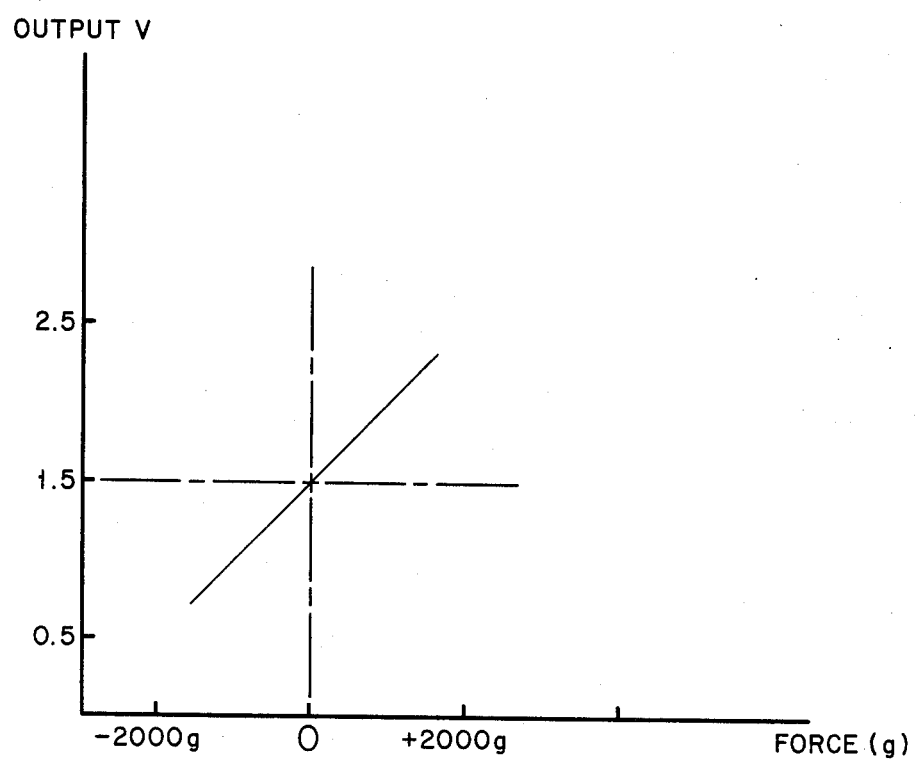
FIG. 5 is a voltage vs. force graphical illustration.

FIG. 5 illustrates, in diagrammatic form, an example of the relationship between output voltage and the force of the displacement sensor 9.

Electrical circuitry required to render the force gauge operative is well known to those skilled in the art and requires no detailed discussion.

The device according to the present invention provides a load detecting device using an electrical position sensor which is supplied at low cost. The constituents of this device can be assembled easily without requiring substantial skill.

In this device, an amount of axial movement of the load introducing rod is directly measured by the optical displacement sensor. The signals generated by the displacement sensor are utilized to operate an indicator of the digital or analogue type on a well known force gauge.

What is claimed is:

1. A load introducing device comprising:
    (a) a yoke including a pair of opposite flexible sides, a pair of opposite rigid sides connected to the flexible sides and a cantilever portion extending from one of the rigid sides between the flexible sides, said cantilever portion having a free end terminating adjacent the other of the rigid sides;
    (b) a load introducing rod fixedly connected to the cantilever portion and extending perpendicularly with respect to said cantilever portion; and
    (c) an optical displacement sensor between the cantilever portion free end and the adjacent rigid side.

2. The device of claim 1, wherein said adjacent rigid side includes fitting holes provided therein.

3. The device of claim 1, wherein said optical displacement sensor includes a light source and a semiconductor element.

4. The device of claim 1, wherein the load introducing rod protrudes through an opening provided in one of the flexible sides.

5. The device of claim 1, wherein said flexible sides include low section-modulus portions.

6. The device of claim 1, wherein said flexible sides and said rigid sides are interconnected by low section-modulus portions.

7. The device of claim 3, wherein the light source is connected to the cantilever portion and the semiconductor element is connected to the adjacent rigid side.

8. A load introducing device comprising:
   (a) a rectangular yoke including a pair of opposite flexible sides, a pair of opposite rigid sides connected to the flexible sides and a cantilever portion extending from one of the rigid sides between, and in parallel with, the flexible sides, said cantilever portion including a free end terminating adjacent the other of the rigid sides;
   (b) a load introducing rod fixed to extend perpendicularly from the cantilever portion of the yoke; and
   (c) an optical displacement sensor provided between the cantilever portion free end and the adjacent rigid side, said adjacent rigid side having a plurality of fitting holes formed therein.

9. The device of claim 8, wherein the load introducing rod protrudes through an opening provided in one of the flexible sides.

10. The device of claim 8, wherein the optical displacement sensor includes a light source and a semiconductor element.

11. The device of claim 8, wherein said flexible sides include low section-modulus portions.

12. The device of claim 8, wherein said flexible sides and said rigid sides are interconnected by low section-modulus portions.

* * * * *